US012803319B2

(12) United States Patent
Choi

(10) Patent No.: US 12,803,319 B2
(45) Date of Patent: Nov. 17, 2026

(54) BATTERY MANAGEMENT APPARATUS AND BATTERY SYSTEM INCLUDING THE SAME

(71) Applicant: LG ENERGY SOLUTION, LTD., Seoul (KR)

(72) Inventor: Jang-Hyeok Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 877 days.

(21) Appl. No.: 18/026,035

(22) PCT Filed: Mar. 21, 2022

(86) PCT No.: PCT/KR2022/003933
§ 371 (c)(1),
(2) Date: Mar. 13, 2023

(87) PCT Pub. No.: WO2022/203325
PCT Pub. Date: Sep. 29, 2022

(65) Prior Publication Data
US 2023/0369877 A1 Nov. 16, 2023

(30) Foreign Application Priority Data
Mar. 24, 2021 (KR) ........................ 10-2021-0038128

(51) Int. Cl.
*H02J 7/96* (2026.01)
*H02J 7/63* (2026.01)
*H02J 7/80* (2026.01)

(52) U.S. Cl.
CPC *H02J 7/96* (2026.01); *H02J 7/63* (2026.01); *H02J 7/80* (2026.01); *H02J 2207/10* (2020.01); *H02J 2207/20* (2020.01)

(58) Field of Classification Search
CPC ............. H02J 7/007182; H02J 7/00306; H02J 7/0047; H02J 2207/10; H02J 2207/20; H02M 1/36; H02M 1/08; Y02E 60/10
(Continued)

(56) References Cited

U.S. PATENT DOCUMENTS 7,906,934 B2 * 3/2011 Inoue ...................... H02J 3/381 320/140
8,736,101 B2 * 5/2014 Masuda .................. B60L 50/40 307/9.1
(Continued)

FOREIGN PATENT DOCUMENTS

CN 105958815 A 9/2016
CN 109808547 A 5/2019
(Continued)

OTHER PUBLICATIONS

KR20200051394A Apparatus and Method for Diagnosing a Power Switch, Machine Translation (Year: 2020).*
(Continued)

*Primary Examiner* — M Baye Diao
(74) *Attorney, Agent, or Firm* — Birch, Stewart, Kolasch & Birch, LLP

(57) ABSTRACT

A battery management apparatus according to an embodiment of the present disclosure includes a converter unit electrically connected to a node between a battery and one end of a positive electrode relay connected in series to the battery and for converting a voltage of the battery into a predetermined voltage and output the predetermined voltage based on an operation mode; and a converter driving unit connected to the node to receive the battery voltage from the battery and for controlling the operation mode of the converter unit to a shutdown mode in which the converter unit is inactivated or a wakeup mode in which the battery voltage is applied as a driving power to activate the converter unit
(Continued)

according to whether a converter driving signal is input from the outside.

15 Claims, 3 Drawing Sheets

(58) Field of Classification Search
USPC .......................................................... 320/163
See application file for complete search history.

(56) References Cited

U.S. PATENT DOCUMENTS

| | | | | |
|---|---|---|---|---|
| 9,496,738 | B2 * | 11/2016 | Herrmann | H02J 7/90 |
| 9,705,408 | B2 * | 7/2017 | Quigley | H02M 1/36 |
| 10,033,213 | B2 * | 7/2018 | Dulle | G01R 31/50 |
| 10,116,154 | B2 | 10/2018 | Kim | |
| 11,063,460 | B2 * | 7/2021 | Hofer | H01M 10/425 |
| 12,057,774 | B2 * | 8/2024 | Shkoury | H02M 3/1582 |
| 2006/0267552 | A1 * | 11/2006 | Baer | H02J 7/342 320/128 |
| 2009/0086517 | A1 * | 4/2009 | Wei | H02M 3/156 363/50 |
| 2010/0008117 | A1 | 1/2010 | Luthi et al. | |
| 2012/0163054 | A1 | 6/2012 | Luthi et al. | |
| 2012/0299377 | A1 | 11/2012 | Masuda et al. | |
| 2013/0009466 | A1 | 1/2013 | Kumagai | |
| 2013/0113430 | A1 | 5/2013 | Kim | |
| 2014/0334185 | A1 | 11/2014 | Hosotani | |
| 2016/0164282 | A1 | 6/2016 | Bellala et al. | |
| 2016/0268902 | A1 | 9/2016 | Yamaguchi et al. | |
| 2017/0126051 | A1 * | 5/2017 | Cox | B25F 5/02 |
| 2018/0093588 | A1 * | 4/2018 | Hosaka | B60L 15/42 |
| 2018/0191172 | A1 | 7/2018 | Melin | |
| 2019/0089257 | A1 | 3/2019 | Chung et al. | |
| 2019/0245448 | A1 | 8/2019 | Chung et al. | |
| 2019/0245449 | A1 | 8/2019 | Chung et al. | |
| 2019/0245450 | A1 | 8/2019 | Chung et al. | |
| 2019/0252986 | A1 | 8/2019 | Chung et al. | |
| 2019/0379217 | A1 | 12/2019 | Song et al. | |
| 2020/0052346 | A1 | 2/2020 | Park | |
| 2020/0376971 | A1 | 12/2020 | Takemoto | |
| 2021/0173470 | A1 | 6/2021 | Kim | |

FOREIGN PATENT DOCUMENTS

| | | | | |
|---|---|---|---|---|
| CN | 209375465 U | | 9/2019 | |
| EP | 2544331 A2 | * | 1/2013 | H02M 3/04 |
| EP | 3 308 993 A1 | | 4/2018 | |
| JP | 6-339222 A | | 12/1994 | |
| JP | 9-230446 A | | 9/1997 | |
| JP | 10-94183 A | | 4/1998 | |
| JP | 2006-353016 A | | 12/2006 | |
| JP | 2008-283786 A | | 11/2008 | |
| JP | 2011-223755 A | | 11/2011 | |
| JP | 2015-180140 A | | 10/2015 | |
| JP | 6100175 B2 | | 3/2017 | |
| JP | 2020-518096 A | | 6/2020 | |
| JP | 6791796 B2 | | 11/2020 | |
| KR | 10-2011-0049793 A | | 5/2011 | |
| KR | 10-2013-0049880 A | | 5/2013 | |
| KR | 10-2019-0034888 A | | 4/2019 | |
| KR | 10-2019-0054708 A | | 5/2019 | |
| KR | 10-2042392 B1 | | 11/2019 | |
| KR | 20200051394 A | * | 5/2020 | H01M 2/1016 |
| KR | 102204983 B1 | * | 1/2021 | H02J 7/00302 |
| KR | 102695515 B1 | * | 8/2024 | H01M 10/486 |
| WO | WO-2006127244 A2 | * | 11/2006 | H02J 7/342 |

OTHER PUBLICATIONS

International Search Report (PCT/ISA/210) issued in PCT/KR2022/003933 mailed on Jul. 15, 2022.

Extended European Search Report for European Application No. 22776026.1, dated Apr. 10, 2024.

* cited by examiner

BATTERY MANAGEMENT APPARATUS AND BATTERY SYSTEM INCLUDING THE SAME

TECHNICAL FIELD

The present application claims priority to Korean Patent Application No. 10-2021-0038128 filed on Mar. 24, 2021 in the Republic of Korea, the disclosures of which are incorporated herein by reference.

The present disclosure relates to a battery management apparatus and a battery system including the same, and more particularly, to a battery management apparatus for preventing a battery from being overcharged and a battery system including the same.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

In general, a battery is provided in a battery pack, and may supply power to a device such as a battery management system (BMS) provided in the battery pack through a DC-DC converter. In this case, since the power applied from the battery to the BMS or the like is always supplied, there is a problem that the battery voltage may be continuously consumed even when the connection between the battery pack and the load is cut off. That is, since the battery voltage is continuously consumed while the DC-DC converter is being driven, there is a problem that the battery may be overdischarged. Therefore, it is required to develop a technology that can increase the lifespan of the battery by controlling the driving of the DC-DC converter to prevent the battery from being overdischarged.

DISCLOSURE

Technical Problem

The present disclosure is designed to solve the problems of the related art, and therefore the present disclosure is directed to providing a battery management apparatus capable of preventing a battery from being overcharged by controlling an operation mode of a converter unit, and a battery system including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A battery management apparatus according to one aspect of the present disclosure may comprise: a converter unit electrically connected to a node between a battery and a first end of a positive electrode relay connected in series to the battery, the converter unit being configured to convert a voltage of the battery into a predetermined voltage and output the predetermined voltage based on an operation mode; and a converter driving unit connected to the node to receive the battery voltage from the battery, the converter driving unit being configured to control the operation mode of the converter unit to a shutdown mode in which the converter unit is inactivated or a wakeup mode in which the battery voltage is applied to activate the converter unit according to whether a converter driving signal is input to the converter driving unit from the outside.

The converter driving unit may be configured to control the operation mode of the converter unit to the shutdown mode, when the converter driving signal is not input.

The converter driving unit may be configured to control the operation mode of the converter unit to the wakeup mode, when the converter driving signal is input.

The converter driving unit may include a field effect transistor (FET) connected between the node and the converter unit and configured to control the operation mode of the converter driving unit by sending the battery voltage input from the node to the converter unit according to an operation state of the FET; and a FET control unit configured to control the operation state of the FET to a turn-on state or a turn-off state according to whether the converter driving signal is input to the converter driving unit.

The FET may include a source terminal connected to the node, a drain terminal connected to the converter driving unit, and a gate terminal connected to the FET control unit.

The FET control unit may be configured to have a first end connected to the gate terminal and a second end connected to the ground.

When the converter driving signal is input, the FET control unit may be configured to control the operation state of the FET to electrically connect the source terminal to the drain terminal by connecting the gate terminal and the to the ground to send the battery voltage to the converter unit.

The converter driving unit may further include a first resistor having a first end connected between the node and the source terminal and a second end connected to the gate terminal; and a second resistor having a first connected between the first resistor and the gate terminal and a second end connected to the FET control unit.

A battery management apparatus according to another aspect of the present disclosure may further comprise a control unit configured to control an operation state of the control unit to an inactive mode or an active mode based on whether a power is applied according to the operation mode of the converter unit and control an operation state of the positive electrode relay according to the controlled operation state.

The control unit may be configured to control the operation state to the active mode by receiving the power from the converter unit, when the operation mode of the converter unit is controlled to the wakeup mode.

The control unit may be configured to control the operation state to the inactive mode by not receiving the power from the converter unit, when the operation mode of the converter unit is controlled to the shutdown mode.

The control unit may be configured to control the operation state of the positive electrode relay to a turn-off state, when the operation state is controlled from the active mode to the inactive mode.

The control unit may be configured to control the operation state of the positive electrode relay to a turn-on state, when the operation state is controlled from the inactive mode to the active mode.

A battery pack according to still another aspect of the present disclosure may comprise the battery management apparatus according to an aspect of the present disclosure.

A battery system according to still another aspect of the present disclosure may comprise the battery pack according to one aspect of the present disclosure; and a load connected to a positive electrode terminal and a negative electrode terminal of the battery pack and configured to output the converter driving signal to the converter driving unit according to an operation state of a switching unit provided therein.

The load may be configured to switch the operation mode of the converter unit to the wakeup mode by outputting the converter driving signal before starting charging of the battery by being connected to the battery pack.

Advantageous Effects

According to one aspect of the present disclosure, by controlling the operation mode of the converter unit, it is possible to prevent the battery from being overdischarged. Accordingly, the battery voltage is prevented from being unnecessarily consumed, thereby increasing the lifespan of the battery.

The effects of the present disclosure are not limited to the effects mentioned above, and other effects not mentioned will be clearly understood by those skilled in the art from the description of the claims.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
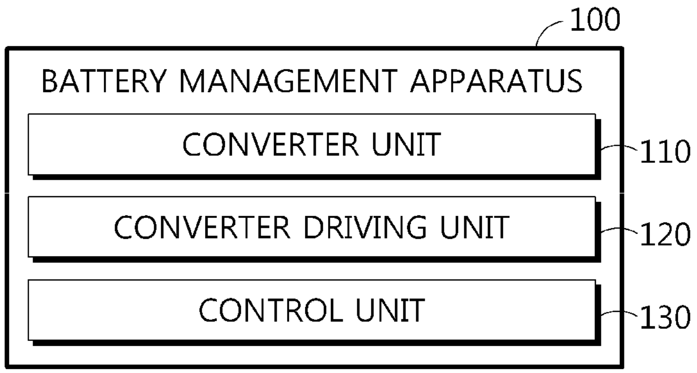
FIG. 1 is a diagram schematically showing a battery management apparatus according to an embodiment of the present disclosure.
Figure 2:
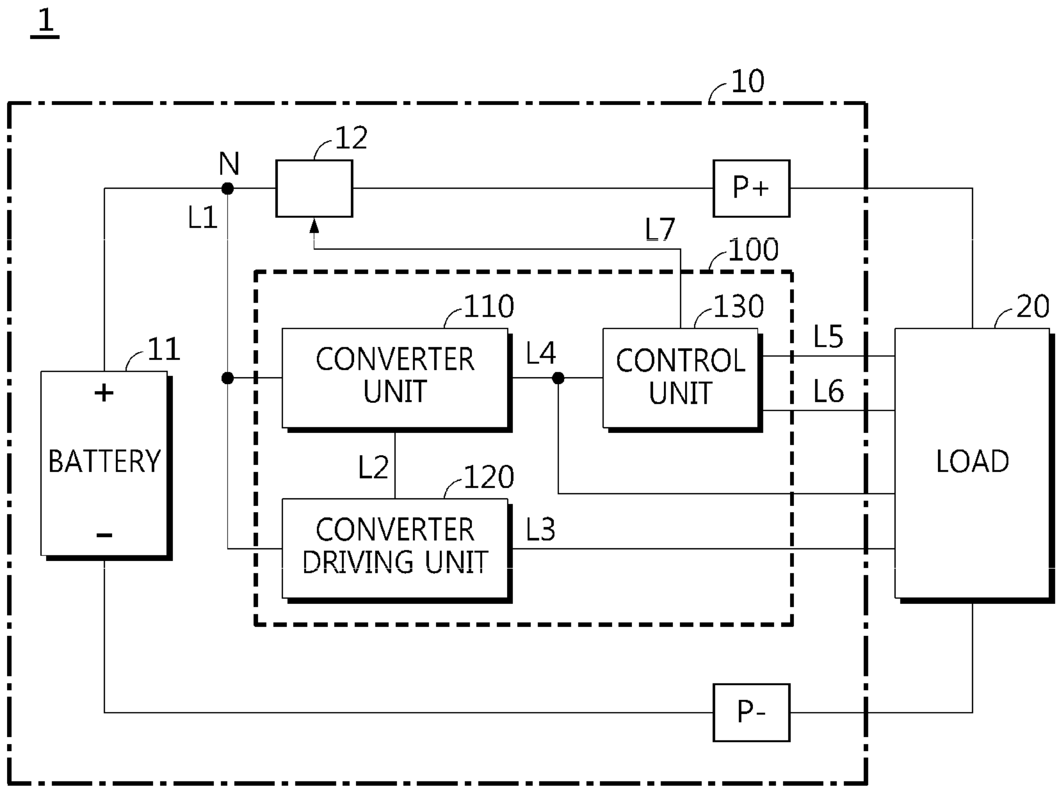
FIG. 2 is a diagram schematically showing an exemplary configuration of a battery pack according to another embodiment of the present disclosure.

FIG. 1 is a diagram schematically showing a battery management apparatus 100 according to an embodiment of the present disclosure. FIG. 2 is a diagram schematically showing an exemplary configuration of a battery pack 10 according to another embodiment of the present disclosure.

Referring to FIG. 1, the battery management apparatus 100 according to an embodiment of the present disclosure may include a converter unit 110 and a converter driving unit 120.

The converter unit 110 may be configured to be electrically connected to a node N between the battery 11 and one end of a positive electrode relay 12 connected in series to the battery 11.

Here, the battery 11 means one physically separable independent cell including a negative electrode terminal and a positive electrode terminal. For example, a lithium-ion battery or a lithium polymer battery may be regarded as the battery 11. Also, the battery 11 may be a battery module in which a plurality of cells are connected in series and/or in parallel. Hereinafter, for convenience of explanation, the battery 11 will be described as meaning one independent cell.

For example, in the embodiment of FIG. 2, the battery 11 may be provided in the battery pack 10. In addition, a positive electrode terminal (+) of the battery 11 may be connected to a positive electrode terminal (P+) of the battery pack 10, and a negative electrode terminal (−) of the battery 11 may be connected to a negative electrode terminal (P−) of the battery pack 10.

In addition, a positive electrode relay 12 may be provided between the positive electrode terminal (+) of the battery 11 and the positive electrode terminal (P+) of the battery pack 10. That is, one end of the positive electrode relay 12 may be connected to the positive electrode terminal (+) of the battery 11, and the other end of the positive electrode relay 12 may be connected to the positive electrode terminal (P+) of the battery pack 10.

For example, in the embodiment of FIG. 2, the converter unit 110 may be electrically connected to a node N between the positive electrode terminal (+) of the battery 11 and one end of the positive electrode relay 12, and receive a battery voltage through a first line L1 connected to the node N.

The converter unit 110 may be configured to convert the voltage of the battery 11 to a predetermined voltage and output the predetermined voltage based on the operation mode.

For example, the converter unit 110 may be a DC-DC converter that converts the voltage of the battery 11 into a predetermined voltage (e.g., 12 V) and outputs the converted voltage. In the embodiment of FIG. 2, the converter unit 110 may convert the battery voltage input through the first line L1 into a predetermined voltage, and output the converted voltage to the control unit 130 and the load 20 through a fourth line L4.

The converter driving unit 120 may be connected to the node N and configured to receive the battery voltage from the battery 11.

For example, the converter driving unit 120 may be driven by receiving the battery voltage from the battery 11. That is, the converter driving unit 120 may be driven by receiving a power from the battery 11.

In the embodiment of FIG. 2, the converter unit 110 and the converter driving unit 120 may be connected to the node N, and receive the battery voltage through the first line L1. However, the converter unit 110 and the converter driving unit 120 are not connected to the node N only through a common line (first line L1), but it should be noted that they may be connected between the positive electrode terminal (+) of the battery 11 and one end of the positive electrode relay 12 through a separate line.

The converter driving unit 120 may be configured to control the operation mode of the converter unit 110 to a shutdown mode in which the converter unit 110 is inactivated or a wakeup mode in which the battery voltage is applied as a driving power to activate the converter unit 110 according to whether a converter driving signal is input from the outside.

Here, the converter unit 110 may include a terminal for receiving a battery voltage through the first line L1 and a terminal for receiving a control signal from the converter driving unit 120 through the second line L2, respectively.

For example, in the embodiment of FIG. 2, the converter driving unit 120 may output a control signal, which is capable of controlling the operation mode of the converter unit 110 according to whether the converter driving signal is received from the load 20 through a third line L3, through the second line L2. In addition, the converter unit 110 may control the operation mode to a shutdown mode or a wakeup mode according to the control signal received from the converter driving unit 120 through the second line L2.

Here, the shutdown mode means a mode in which the converter unit 110 is inactivated not to receive the battery voltage through the first line L1. Conversely, the wakeup mode means a mode in which the converter unit 110 is activated to convert the battery voltage input through the first line L1 into a predetermined voltage and output the converted voltage through the fourth line L4. That is, the shutdown mode is a mode in which the state of the converter unit 110 is turned off, and the wakeup mode is a mode in which the state of the converter unit 110 is turned on.

Specifically, in the embodiment of FIG. 2, when the converter driving unit 120 does not receive the converter driving signal from the load 20 through the third line L3, the converter driving unit 120 may output a control signal for controlling the operation mode of the converter unit 110 to a shutdown mode through the second line L2 A. In this case, since the converter unit 110 cannot receive the battery voltage from the battery 11, it is possible to prevent the voltage of the battery 11 from being continuously consumed by the converter unit 110. Moreover, since the converter unit 110 is inactivated so that the voltage converted by the converter unit 110 is not output, components included in the battery pack 10 other than the converter driving unit 120 may also be inactivated.

Conversely, when the converter driving unit 120 receives the converter driving signal from the load 20 through the third line L3, the converter driving unit 120 may be configured to output a control signal for controlling the operation mode of the converter unit 110 to a wakeup mode through the second line L2. In this case, the converter unit 110 may receive a battery voltage from the battery 11, convert the received battery voltage into a predetermined voltage, and output the converted voltage. Moreover, since the converter unit 110 is activated, other components included in the battery pack 10 may also be activated.

That is, the battery management apparatus 100 according to an embodiment of the present disclosure is characterized by controlling the operation mode of the converter unit 110 according to whether a converter driving signal is input from the outside, in order to prevent the voltage of the battery 11 from being continuously reduced by the converter unit 110. Through this, since the occurrence of leakage current of the battery 11 may be minimized, it is possible to prevent the battery 11 from being overdischarged, and further to increase the lifespan of the battery 11.

Figure 3:
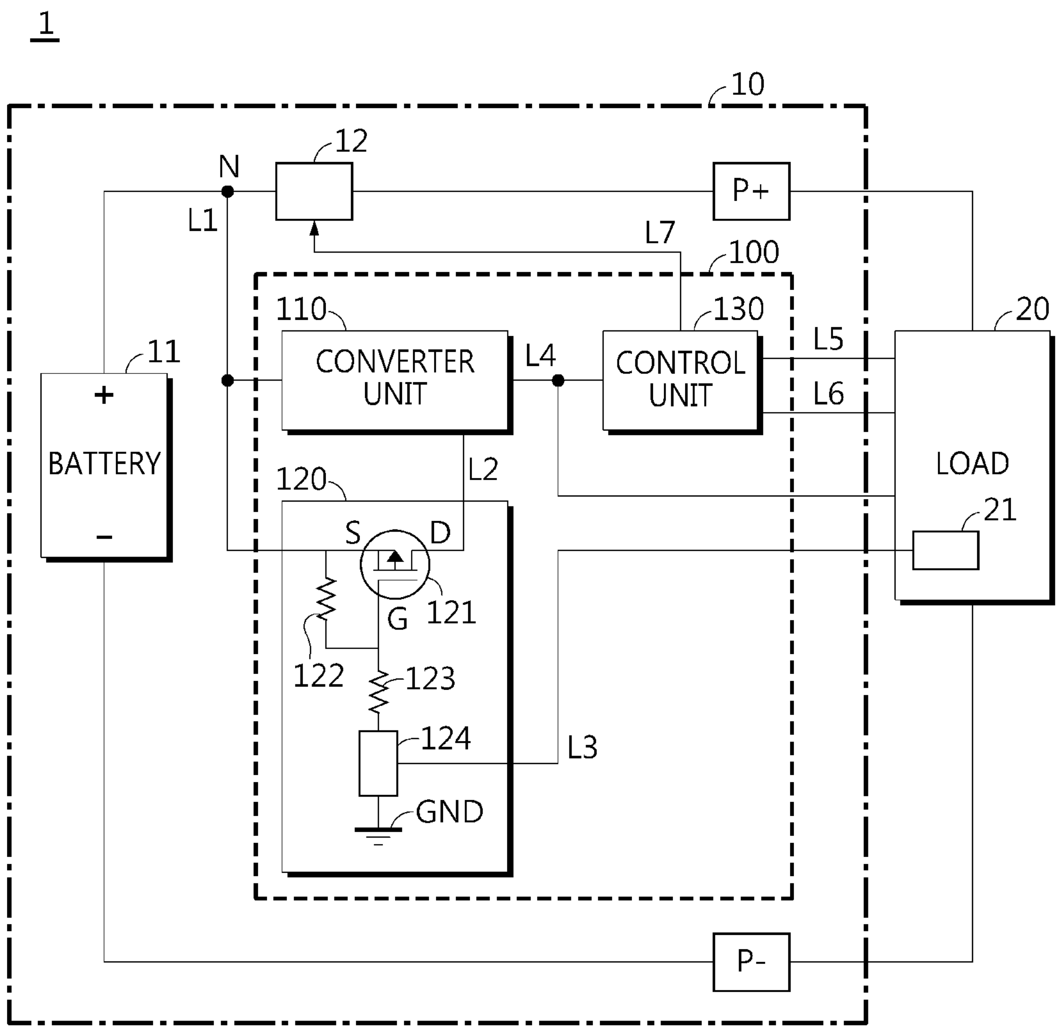
FIG. 3 is a diagram showing the battery pack of FIG. 2 in more detail.

FIG. 3 is a diagram showing the battery pack 10 of FIG. 2 in more detail.

Referring to FIG. 3, the converter driving unit 120 may include a FET 121 and a FET control unit 124.

The FET 121 is a field effect transistor, and a P channel FET 121 is applied in the embodiment of FIG. 3. However, it should be noted that the FET 121 is not limited to only the P-channel FET 121 according to the embodiment of FIG. 3, and various switching devices may be applied without departing from the scope of the present disclosure.

FET 121 may be configured to be connected between the node N and the converter unit 110.

For example, in the embodiment of FIG. 3, the FET 121 may include a source terminal S, a drain terminal D, and a gate terminal G. In addition, the source terminal S may be connected to the node N, the drain terminal D may be connected to the converter unit 110, and the gate terminal G may be connected to the FET control unit 124.

The FET 121 may be configured to control the operation mode of the converter driving unit 120 by sending the battery voltage input from the node N to the converter unit 110 according to an operation state.

The operation state of the FET 121 may include a turn-on state or a turn-off state. The turn-on state means an operation state in which the source terminal S and the drain terminal D of the FET 121 are electrically connected so that a current flows from the source terminal S toward the drain terminal D. Conversely, the turn-off state means an operation state in which the connection between the source terminal S and the drain terminal D of the FET 121 is cut off so that a current cannot flow from the source terminal S toward the drain terminal D.

For example, in the embodiment of FIG. 3, when the operation state of the FET 121 is a turn-on state, the FET 121 may output the battery voltage input through the first line L1 to the converter unit 110 through the second line L2. Conversely, when the operation state of the FET 121 is a turn-off state, the FET 121 may not output the battery voltage, which is input through the first line L1, through the second line L2.

The FET control unit 124 may be electrically connected to the FET 121. Specifically, in the embodiment of FIG. 3, the FET control unit 124 may be configured to have one end connected to the gate terminal G and the other end connected to the ground GND.

In addition, the FET control unit 124 may be configured to control the operation state of the FET 121 to a turn-on state or a turn-off state according to whether a converter driving signal is input.

Specifically, when the converter driving signal is input, the FET control unit 124 may be configured to control the operation state of the FET 121 such that the source terminal S and the drain terminal D of the FET 121 are electrically connected to send the battery voltage to the converter unit 110 by connecting the gate terminal G and the ground GND.

For example, in the embodiment of FIG. 3, when the FET control unit 124 receives a converter driving signal through the third line L3, the FET control unit 124 may be controlled to a turn-on state to electrically connect the drain terminal D of the FET 121 and the ground GND. In this case, since the operation state of the FET 121 is controlled to a turn-on state, the source terminal S and the drain terminal D of the FET 121 may be electrically connected, and the battery voltage input to the source terminal S of the FET 121 through the first line L1 may be output to the converter unit 110 through the second line L2.

Conversely, when the FET control unit 124 does not receive the converter driving signal through the third line L3, the FET control unit 124 may be controlled to a turn-off state to cut off the connection between the drain terminal D of the FET 121 and the ground GND. In this case, since the operation state of the FET 121 is controlled to a turn-off state, the connection between the source terminal S and the drain terminal D of the FET 121 may be cut off. Accordingly, the battery voltage input to the source terminal S of the FET 121 through the first line L1 may not be output to the converter unit 110 through the second line L2.

Therefore, the battery management apparatus 100 according to an embodiment of the present disclosure may prevent the voltage of the battery 11 from continuously reduced by controlling the operation mode of the converter unit 110 to a shutdown mode when the battery 11 and the load 20 are not connected. Accordingly, there is an advantage in that the lifespan of the battery 11 may be increased by preventing the battery 11 from being unexpectedly overdischarged.

Referring to FIG. 3, the converter driving unit 120 may further include a first resistor 122 and a second resistor 123.

The first resistor 122 may be configured to have one end connected between the node N and the source terminal S and the other end connected to the gate terminal G.

For example, in the embodiment of FIG. 3, one end of the first resistor 122 may be connected between the node N and the source terminal S of the FET 121, and the other end of the first resistor 122 may be connected between the gate terminal G of the FET 121 and the FET control unit 124.

The second resistor 123 may be configured to have one end connected between the first resistor 122 and the gate terminal G and the other end connected to the FET control unit 124.

For example, in the embodiment of FIG. 3, one end of the second resistor 123 may be connected between the other end of the first resistor 122 and the gate terminal G of the FET 121, and the other end of the second resistor 123 may be connected to the FET control unit 124.

Accordingly, when the FET control unit 124 receives the converter driving signal from the load 20, the FET control unit 124 may be controlled to a turn-on state to electrically connect the gate terminal G of the FET 121 and the ground GND, and the FET 121 may output the battery voltage input through the first line L1 to the converter unit 110 through the second line L2.

Conversely, when the FET control unit 124 does not receive the converter driving signal from the load 20, the FET control unit 124 may be controlled to a turn-off state to cut off the electrical connection between the gate terminal G of the FET 121 and the ground GND, and the FET 121 may not output the battery voltage, which is input through the first line L1, through the second line L2.

Referring to FIG. 1, the battery management apparatus 100 according to an embodiment of the present disclosure may further include a control unit 130.

The control unit 130 may be configured to control the operation state to an inactive mode or an active mode based on whether a power is applied according to the operation mode of the converter unit 110.

Specifically, when the operation mode of the converter unit 110 is controlled to a wakeup mode, the control unit 130 may receive a power from the converter unit 110 to control the operation state to an active mode. For example, in the embodiment of FIG. 2, the converter unit 110 and the control unit 130 may be connected through a fourth line L4. In addition, when the operation mode is a wakeup mode, the converter unit 110 may convert the battery voltage to a predetermined voltage, and output the converted voltage through the fourth line L4. Accordingly, when the operation mode of the converter unit 110 is a wakeup mode, the control unit 130 may receive the operation power from the converter unit 110 to control the operation state to an active mode.

Conversely, when the operation mode of the converter unit 110 is controlled to a shutdown mode, the control unit 130 may not receive a power from the converter unit 110 to control the operation state to an inactive mode. For example, the converter unit 110 may not receive the battery voltage when the operation mode is a shutdown mode. Accordingly, since the control unit 130 cannot receive the operation power from the converter unit 110, the operation state may be controlled to an inactive mode.

The control unit 130 may be configured to control the operation state of the positive electrode relay 12 according to the controlled operation state.

In the embodiment of FIG. 2, the control unit 130 may be connected to the positive electrode relay 12 through a seventh line L7, and may output a control signal to the positive electrode relay 12 through the seventh line L7.

For example, when the operation state is controlled from the active mode to the inactive mode, the control unit 130 may be configured to control the operation state of the positive electrode relay 12 to a turn-off state. That is, when the operation state of the control unit 130 is controlled to an inactive mode, the output of the control signal through the seventh line L7 may be stopped. Accordingly, when the operation state of the control unit 130 is controlled to an inactive mode, the operation state of the positive electrode relay 12 may be controlled to a turn-off state.

Conversely, the control unit 130 may be configured to control the operation state of the positive electrode relay 12 to a turn-on state, when the operation state is controlled from the inactive mode to the active mode.

For example, in the embodiment of FIG. 2, when the operation mode of the converter unit 110 is controlled to a wakeup mode, the converter unit 110 may output a voltage to the control unit 130 and the load 20 through the fourth line L4. Thereafter, the load 20 may output an enable signal to the control unit 130 through a fifth line L5, and the control unit 130 may communicate with the load 20 through the sixth line L6 when receiving the enable signal through the fifth line L5. In addition, the control unit 130 may control the operation state of the positive electrode relay 12 to a turn-on state through the seventh line L7, in a state capable of communicating with the load 20 through the sixth line L6.

Meanwhile, the control unit 130 provided in the battery management apparatus 100 may selectively include processors known in the art, application-specific integrated circuit (ASIC), other chipsets, logic circuits, registers, communication modems, data processing devices, and the like to execute various control logic performed in the present disclosure. Also, when the control logic is implemented in software, the control unit 130 may be implemented as a set of program modules. At this time, the program module may be stored in a memory and executed by the control unit 130. The memory may be located inside or out of the control unit 130 and may be connected to the control unit 130 by various well-known means.

In addition, the battery management apparatus 100 may further include a storage unit (not shown). The storage unit may store data necessary for operation and function of each component of the battery management apparatus 100, data generated in the process of performing the operation or function, or the like. The storage unit is not particularly limited in its kind as long as it is a known information storage means that can record, erase, update and read data. As an example, the information storage means may include RAM, flash memory, ROM, EEPROM, registers, and the like. In addition, the storage unit may store program codes in which processes executable by the control unit 130 are defined.

Figure 4:
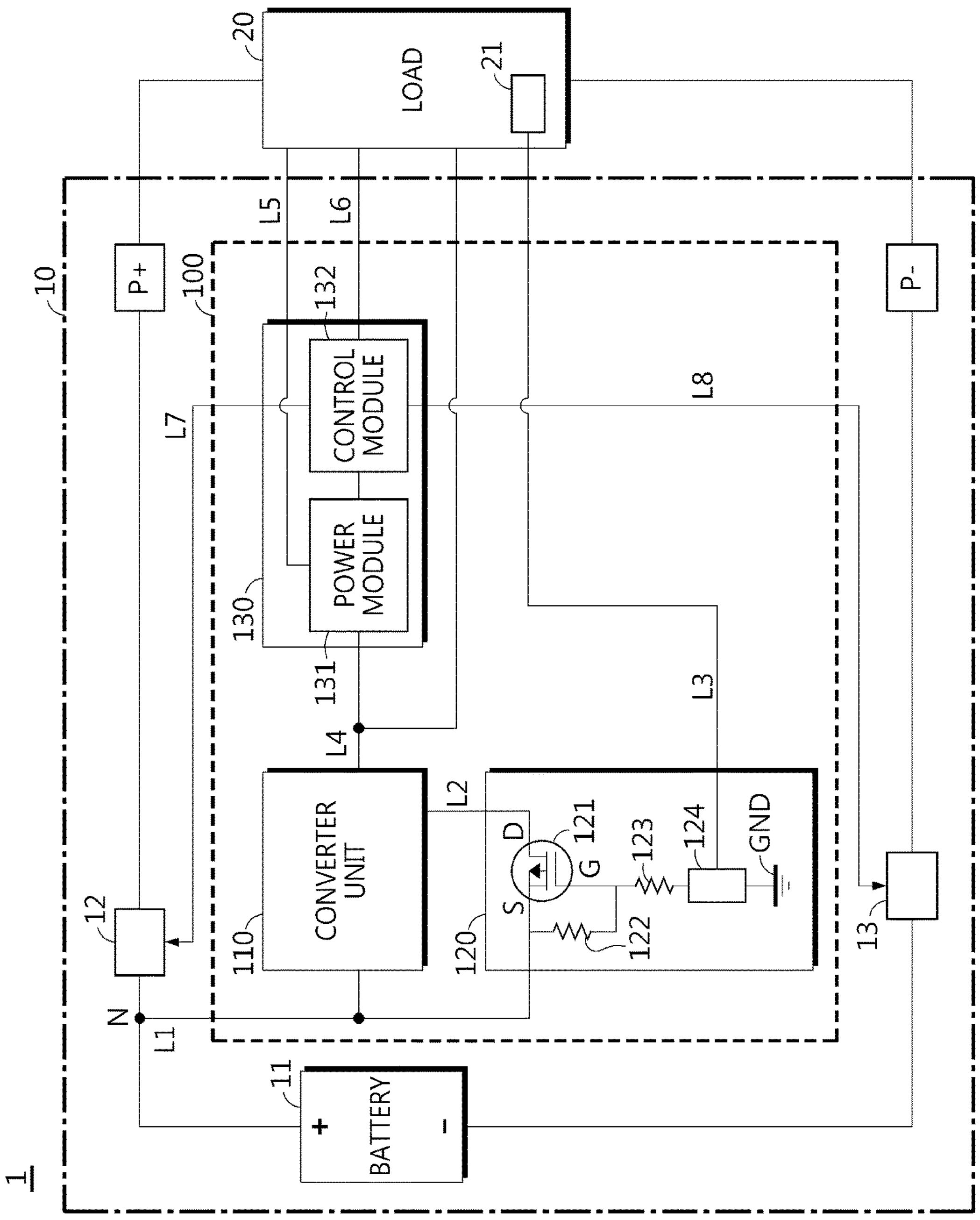
FIG. 4 is a diagram schematically showing an exemplary configuration of a battery system according to still another embodiment of the present disclosure.

FIG. 4 is a diagram schematically showing an exemplary configuration of a battery system 1 according to still another embodiment of the present disclosure.

Referring to FIG. 4, the control unit 130 may include a power module 131 and a control module 132.

The power module 131 may be connected to the converter unit 110 through the fourth line L4. In addition, when the operation mode of the converter unit 110 is a wakeup mode, the power module 131 may receive the converted voltage from the converter unit 110 through the fourth line L4.

In addition, the power module 131 may be connected to the load 20 through the fifth line L5. In addition, when receiving the enable signal from the load 20 through the fifth line L5, the power module 131 may apply a power to the control module 132 to control the operation state of the control module 132 to an activated state.

When a power is received from the power module 131, the control module 132 may be connected to communicate with the load 20 through the sixth line L6. When the control module 132 is able to communicate with the load 20 through the sixth line L6, the control module 132 may control the operation state of the positive electrode relay 12 through the seventh line L7.

Also, referring to FIG. 4, the battery pack 10 may further include a negative electrode relay 13 connected between the negative electrode terminal (−) of the battery 11 and the negative electrode terminal (P−) of the battery pack 10. That is, one end of the negative electrode relay 13 may be connected to the negative electrode terminal (−) of the battery 11, and the other end of the negative electrode relay 13 may be connected to the negative electrode terminal (P−) of the battery pack 10.

After the control module 132 is connected to be able to communicate with the load through the sixth line L6, the control module 132 may control the operation state of the negative electrode relay 13 through an eighth line L8.

For example, in the embodiment of FIG. 4, when the control module 132 is in a state capable of communicating with the load 20 through the sixth line L6, the control module 132 may control the operation state of the positive electrode relay 12 to a turn-on state through the seventh line L7 and control the operation state of the negative electrode relay 13 to a turn-on state through the eighth line L8. Therefore, the positive electrode terminal (+) of the battery 11, the positive electrode terminal (P+) of the battery pack 10, the load 20, the negative electrode terminal (P−) of the battery pack 10, and the negative electrode terminal (−) of the battery 11 may be electrically connected, and the battery 11 may be charged by the load 20.

Also, referring to FIG. 4, the battery system 1 may include a battery pack 10 and a load 20.

The load 20 may be configured to be connected to the positive electrode terminal (P+) and the negative electrode terminal (P−) of the battery pack 10.

For example, in the embodiment of FIG. 4, one end of load 20 may be connected to the positive electrode terminal (P+) of the battery pack 10, the other end of the load 20 may be connected to the negative electrode terminal (P−) of the battery pack 10. In addition, when both the operation states of the positive electrode relay 12 and the negative electrode relay 13 are controlled to a turn-on state, the battery 11 and the load 20 may be electrically connected.

The load 20 may be configured to output a converter driving signal to the converter driving unit 120 according to the operation state of a switching unit 21 provided therein.

Preferably, the load 20 may be configured to switch the operation mode of the converter unit 110 to a wakeup mode by outputting the converter driving signal before starting charging of the battery 11 by being connected to the battery pack 10.

Specifically, the load 20 may control the operation state of the switching unit 21 to a turn-on state before starting charging of the battery 11 and while charging the battery 11. In addition, when the operation state of the switching unit 21 is a turn-on state, the load 20 may output a converter driving signal to the converter driving unit 120. In this case, the operation state of the FET control unit 124 may be controlled to a turn-on state so that the gate terminal G of the FET 121 and the ground GND are electrically connected, and the battery voltage applied to the FET 121 through the first line L1 may be output to the converter unit 110 through the second line L2. Thereafter, the operation mode of the converter unit 110 may be controlled to a wakeup mode, and the control unit 130 receiving a power from the converter unit 110 may be activated. In addition, when the control unit 130 is in a state capable of communicating with the load 20, the operation state of the positive electrode relay 12 and the negative electrode relay 13 may be controlled to a turn-on state. Finally, as the battery 11 and the load 20 are electrically connected, the battery 11 may be charged by the load 20.

Conversely, the load 20 may control the operation state of the switching unit 21 to a turn-off state when charging of the battery 11 is not performed and when charging of the battery 11 is completed. Also, when the operation state of the switching unit 21 is a turn-off state, the load 20 may not output a converter driving signal to the converter driving unit 120. In this case, the operation state of the FET control unit 124 may be controlled to a turn-off state so that the electrical connection between the gate terminal G of the FET 121 and the ground GND is cut off. Thereafter, since the battery voltage applied to the FET 121 through the first line L1 is blocked from being output to the converter unit 110 through the second line L2, the operation mode of the converter unit 110 may be controlled to a shutdown mode. In addition, since the control unit 130 does not receive a power from the converter unit 110, the control unit 130 may be inactivated. Also, the operation state of the positive electrode relay 12 and the negative electrode relay 13 may be controlled to a turn-off state, and the electrical connection between the battery 11 and the load 20 may be cut off. Therefore, the battery 11 may not be charged by the load 20. However, in this case, since the operation mode of the converter unit 110 is controlled to a shutdown mode, the battery 11 is blocked from being discharged by the converter unit 110, and thus it is possible to prevent the battery 11 from being overcharged.

The battery management apparatus 100 according to the present disclosure may be applied to a BMS (Battery Management System). That is, the BMS according to the present disclosure may include the battery management apparatus 100 described above. In this configuration, at least some of the components of the battery management apparatus 100 may be implemented by supplementing or adding functions of the configuration included in the conventional BMS. For example, the converter unit 110, the converter driving unit 120 and the control unit 130 may be implemented as components of the BMS.

The embodiments of the present disclosure described above may not be implemented only through an apparatus, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

10: battery pack
11: battery
12: positive electrode relay
13: negative electrode relay
20: load
21: switching unit
100: battery management apparatus
110: converter unit
120: converter driving unit
130: control unit
131: power module
132: control module

What is claimed is:

1. A battery management apparatus, comprising:
a converter unit directly electrically connected to a node between a battery and a first end of a positive electrode relay connected in series to the battery, the converter unit being configured to convert a first voltage value into a predetermined voltage value and output the predetermined voltage value based on an operation mode, the first voltage value being a voltage suppled directly from the battery via the node; and
a converter driving unit directly connected to the same node to receive the first voltage value from the battery, the converter driving unit being configured to control the operation mode of the converter unit to a shutdown mode in which the converter unit is inactivated or a wakeup mode in which the first voltage value is applied to activate the converter unit according to whether a converter driving signal is input to the converter driving unit from the outside.

2. The battery management apparatus according to claim 1,
wherein the converter driving unit is configured to control the operation mode of the converter unit to the shutdown mode, when the converter driving signal is not input, and
wherein the converter driving unit is configured to control the operation mode of the converter unit to the wakeup mode, when the converter driving signal is input.

3. The battery management apparatus according to claim 1, further comprising:
a control unit configured to:
control an operation state of the control unit to an inactive mode or an active mode based on whether a power is applied according to the operation mode of the converter unit, and
control an operation state of the positive electrode relay according to the controlled operation state.

4. The battery management apparatus according to claim 3, wherein the control unit is configured to:
control the operation state to the active mode by receiving the power from the converter unit, when the operation mode of the converter unit is controlled to the wakeup mode, and
control the operation state to the inactive mode by not receiving the power from the converter unit, when the operation mode of the converter unit is controlled to the shutdown mode.

5. The battery management apparatus according to claim 4, wherein the control unit is configured to:
control the operation state of the positive electrode relay to a turn-off state, when the operation state is controlled from the active mode to the inactive mode, and
control the operation state of the positive electrode relay to a turn-on state, when the operation state is controlled from the inactive mode to the active mode.

6. A battery pack, comprising the battery management apparatus according to claim 1.

7. A battery system, comprising:
the battery pack according to claim 6; and
a load connected to a positive electrode terminal and a negative electrode terminal of the battery pack and configured to output the converter driving signal to the converter driving unit according to an operation state of a switching unit.

8. The battery system according to claim 7,
wherein the load is configured to switch the operation mode of the converter unit to the wakeup mode by outputting the converter driving signal before starting charging of the battery by being connected to the battery pack.

9. The battery management apparatus according to claim 1, wherein the first voltage value and the predetermined voltage value are different voltages.

10. The battery management apparatus according to claim 1, wherein the converter driving unit is configured to generate and output a control signal for controlling the operation mode of the converter unit, to the converter unit according to whether the converter driving signal is received by the converter driving unit from a load.

11. The battery management apparatus according to claim 1, wherein the converter driving unit includes an element directly connected between the node and the converter unit and configured to control the operation mode of the converter driving unit by sending the first voltage value input from the node to the converter unit according to an operation state of the element.

12. A battery management apparatus, comprising:

a converter unit electrically connected to a node between a battery and a first end of a positive electrode relay connected in series to the battery, the converter unit being configured to convert a voltage into a predetermined voltage and output the predetermined voltage based on an operation mode; and a converter driving unit connected to the node to receive the battery voltage from the battery, the converter driving unit being configured to control the operation mode of the converter unit to a shutdown mode in which the converter unit is inactivated or a wakeup mode in which the battery voltage is applied to activate the converter unit according to whether a converter driving signal is input to the converter driving unit from the outside, wherein the converter driving unit includes:

a field effect transistor (FET) connected between the node and the converter unit and configured to control the operation mode of the converter driving unit by sending the battery voltage input from the node to the converter unit according to an operation state of the FET; and a FET control unit configured to control the operation state of the FET to a turn-on state or a turn-off state according to whether the converter driving signal is input to the converter driving unit.

13. The battery management apparatus according to claim 12, wherein the FET includes a source terminal connected to the node, a drain terminal connected to the converter driving unit, and a gate terminal connected to the FET control unit, and wherein the FET control unit is configured to have a first end connected to the gate terminal and a second end connected to the ground.

14. The battery management apparatus according to claim 13, wherein when the converter driving signal is input, the FET control unit is configured to control the operation state of the FET to electrically connect the source terminal to the drain terminal by connecting the gate terminal to the ground to send the battery voltage to the converter unit.

15. The battery management apparatus according to claim 13, wherein the converter driving unit further includes:

a first resistor having a first end connected between the node and the source terminal and a second end connected to the gate terminal; and a second resistor having a first end connected between the first resistor and the gate terminal and a second end connected to the FET control unit.

* * * * *